United States Patent [19]

Nakanowatari

[11] Patent Number: 4,610,508

[45] Date of Patent: Sep. 9, 1986

[54] LIQUID CRYSTAL DISPLAY DEVICE HAVING PARTICULAR DEGREE OF POLARIZATION

[75] Inventor: Jun Nakanowatari, Miyagi, Japan

[73] Assignee: Alps Electric Co., Ltd., Japan

[21] Appl. No.: 624,056

[22] Filed: Jun. 25, 1984

[30] Foreign Application Priority Data

Jun. 24, 1983 [JP] Japan ................................ 58-112666

[51] Int. Cl.⁴ ............................................ G02F 1/13
[52] U.S. Cl. .................................... 350/337; 350/349
[58] Field of Search ................................. 350/337, 349

[56] References Cited

U.S. PATENT DOCUMENTS

| | | | |
|---|---|---|---|
| 3,963,312 | 6/1976 | Wild | 350/337 |
| 4,398,803 | 8/1983 | Pohl et al. | 350/337 X |
| 4,427,741 | 1/1984 | Aizawa et al. | 350/337 X |
| 4,527,864 | 7/1985 | Dir | 350/337 |

*Primary Examiner*—John K. Corbin
*Assistant Examiner*—Richard F. Gallivan
*Attorney, Agent, or Firm*—Guy W. Shoup

[57] ABSTRACT

Disclosed is a liquid crystal display device in which a twisted nematic type liquid crystal display element is used as a light shutter and combined with color polarizer plates to provide color display, characterized in that a nematic crystal added with a black coloring matter is used and in that at least one of the polarizer plates has a degree of polarization of about 80% or less. Preferably, the rate of addition of the black coloring matter is limited to about 1.5% or less.

2 Claims, 1 Drawing Figure

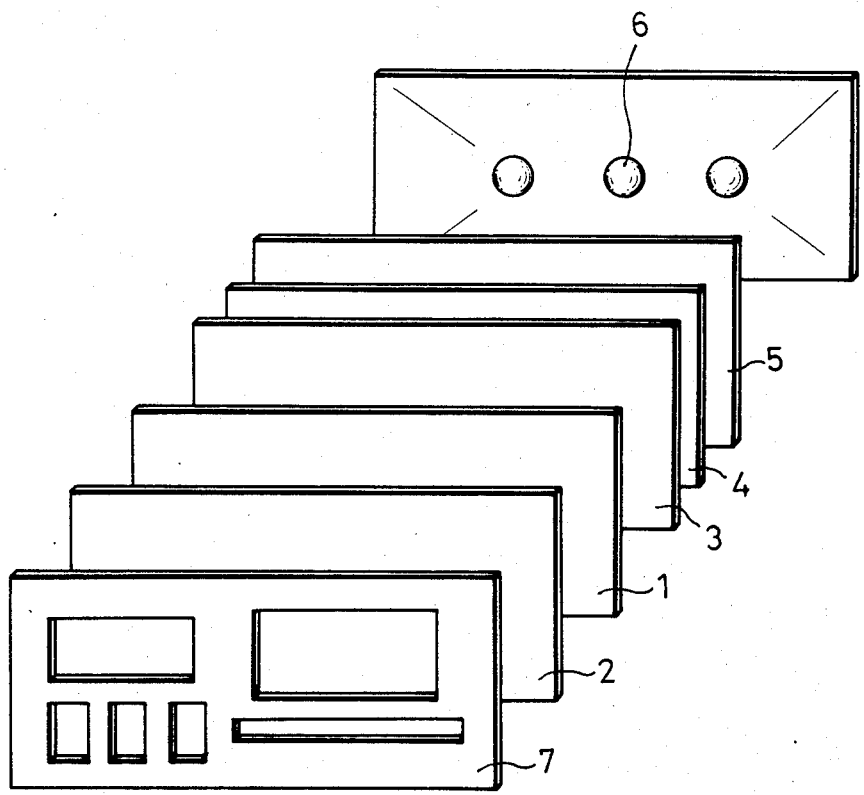

LIQUID CRYSTAL DISPLAY DEVICE HAVING PARTICULAR DEGREE OF POLARIZATION

BACKGROUND OF THE INVENTION

The present invention relates to liquid crystal display devices and more particularly to color liquid crystal display devices in which a liquid crystal element of the twisted nematic type (hereinafter referred to as TN type) and a color polarizer plate are combined so as to provide multicolor display.

Many conventional liquid crystal multicolor display devices are of the system in which a liquid crystal display element which functions as a light shutter is used in combination with multicolor filters or polarizer plates. Particularly, the system mentioned above includes a system in which a black dichroic matter is added to a liquid crystal to be used as a light shutter element of the guest-host type, a system in which a TN shutter element constituted by two, upper and lower, polarizer plates of TN type arranged with their polarization axes made in the same direction so as to be black when no voltage is applied while allow light to pass therethrough upon application of a voltage is combined with color filters, and so on.

However, these systems have disadvantages. That is, in the former system using a black guest-host type, the change characteristic of light transmission factor is gentle in the vicinity of a threshold value due to the applied voltage, so that it is difficult to drive the device in the time-divisional mode but the device can be driven statically. Further, in order to make the contrast high between the case where a voltage is applied to the device and the case where no voltage applied to the same, the quantity of addition of the black material must be increased, and, if so, the quantity of light transmission upon the application of voltage is reduced to make the display per se dark. In some cases, alternatively, the device is arranged to have a two-layered cell construction. This arrangement may provide, however, a significant factor of increase in cost.

In the latter case, on the other hand, although the threshold characteristic and the contrast are improved at a large extent in comparison with the guest-host system, the display has dependency on visual angle and good contrast can be obtained when viewed only in the specific direction. The dependency on visual angle is an essential characteristic of the TN system and it is possible to intensify the contrast and widen the effective visual angle by reducing the product $\Delta n \cdot d$ between the refractive index anisotropy $\Delta n$ and the cell gap thickness $d$. If the value of this product $\Delta n \cdot d$ is reduced too much, however, the light transmissive efficiency of the TN liquid crystal element is lowered and interference color may occur upon application of no voltage to thereby excessively deteriorate the quality of display. Accordingly, the lower limit value of $\Delta n \cdot d$ is the order of but no more than $1.2(m\mu m)$.

The display mode of the TN type liquid crystal element used in ordinary electronic calculators or wrist watches is a positive display system in which the display color is transparent upon application of no voltage while black upon application of a voltage. Accordingly, if the value $\Delta n \cdot d$ is small, interference color is generated at transparent portions. Since a silver or white reflection plate is used, generally, the interference color is not so conspicuous, and if the cell gap is uniform, the color tone of the interference color is also uniform all over the area so that, in many cases, the interference color does not cause inconvenience in practical use even if it is generated a little. Recently, conjointly with the fact that variations in the cell gap have been decreased with the advance of manufacturing technique, the value $\Delta n \cdot d$ has a tendency to be designed to have a small value such as 1.0 or 0.8. In the case where the TN type liquid crystal element is used as a light shutter for multicolor display, however, the displaying color is black upon application of no voltage, and, therefore, interference color is very conspicuous if generated. Accordingly, in this case, the value $\Delta n \cdot d$ is compelled to be made large at the sacrifice of the visual angle as well as the contrast, in order to prevent the interference color form occuring.

SUMMARY OF THE INVENTION

An object of the present invention is to delete the defects in the prior art as discussed above.

Another object of the present invention is to provide a liquid crystal display device in which a wide visual angle can be assured while suppressing occurrence of interference color.

To attain these objects, according to an aspect of the present invention, the display element in which a TN type liquid crystal element is used as a light shutter and combined with color polarizer plates to perform color display is characterized in that a nematic liquid crystal added with a black coloring matter is used and the degree of polarization of at least one of the polarizer plates is lower than about 80%.

These and other objects, features and advantages of the invention will become apparent by reference to the following detailed descrition, taking in connection with the accompanying drawing.

BRIEF DESCRIPTION OF THE DRAWINGS

The single FIGURE is an exploded perspective view of an embodiment of the liquid crystal display device according to the present invention.

DESCRIPTION OF PREFERRED EMBODIMENTS

Referring to the drawings, preferred embodiments of the present invention will be described hereunder.

A TN type LCD was produced by pouring a nematic liquid crystal (ROCHE: Trade Name RO-TN-653) into a liquid crystal cell arranged to have a base gap of 10 $\mu m$. The refraction anisotropy $\Delta n$ of the RO-TN-653 liquid crystal was 0.136 and therefore $\Delta n \cdot d$ was 1.36.

Polarizer plates of different degree of polarization were combined with this LCD to provide various combinations of polarization axes of the negative type in which light was prevented from passing therethrough upon application of no voltage and white light was disposed at the rear side of the combination polaroid plates to visually test the conditions of occurrence of interference color of the light passed through the combination of polarizer plates, thereby obtaining the results as shown in the following Table 1:

TABLE 1

| USED POLARIZER PLATES | EXTENT OF INTERFERENCE COLOR |
| --- | --- |
| A(99) 2 PLATES | X X |
| B(95) 2 PLATES | X |
| C(80) 2 PLATES | Δ |
| A(99) AND B(95) | X X |
| A(99) AND C(80) | Δ |

TABLE 1-continued

| USED POLARIZER PLATES | EXTENT OF INTERFERENCE COLOR |
|---|---|
| B(95) AND C(80) | Δ |

In this Table 1, the numeral in ( ) represents the degree of polarization, and therefore A(99), B(95) and C(80) represent a polaroid plate of the degree of polarization of 99%, a polarizer plate of the degree of polarization of 95%, and a polarizer plate of the degree of polarization of 80%. In the column of the extent of interference color in the Table 1, the marks ××, × and Δ represent the evaluations which were judged that the occuurence of interference color was very conspicuous, considerably conspicuous, and somewhat conspicuous, respectively.

As seen from the Table 1, there is a tendency that the occurrence of interference color can be more suppressed in the case where the polarizer plate C having a low degree of polarization (80%) is used. If such a polarizer plate of low degree of polarization is used, however, it is impossible to provide a complete black color upon application of no voltage to lower the contrast. Particularly, in the case where such a display effect that a vivid color display appears with a completely black background, such a display can not be realized by using polarizer plates each having a low degree of polarization. Accordingly, a black dichroism coloring matter was added to 10% to the liquid crystal to test the extent of occurrence of interference color and the results as shown in the following Table 2 were obtained:

TABLE 2

| USED POLARIZER PLATES | EXTENT OF INTERFERENCE COLOR |
|---|---|
| A(99) 2 PLATES | × |
| B(95) 2 PLATES | Δ |
| C(80) 2 PLATES | ○ |
| A(99) AND B(95) | Δ |
| A(99) AND C(80) | ○ |
| B(95) AND C(80) | ○ |

In the column of the "extent of interference color" in the Table 2, the mark O represents the evaluation which was judged that there was less occurrence of interference color, while the evaluation standard of the marks ××, × and Δ is the same as in the Table 1.

Thus, even in the case where 1% quantity of coloring matter is added in this manner, the effect of the coloring matter is not so conspicuous if a polarizer plate of a low degree of polarization below 80% is used as one of the pair of polarizer plates.

Since as the quantity of addition of coloring matter is decreased the quantity of passed light is more increased to increase the brightness of display, the combination is preferable in which a coloring matter of about 1.5% or less is added and a polarizer plate of the degree of polarization of 80% or less is used as one of a pair of polarizer plates.

Referring to the single figure of drawing, embodiments of the present invention will be described next.

EMBODIMENT 1

A liquid crystal cell 1 having a base-plate gap of 10 μm and a nematic liquid crystal (MERCK & CO.: Trade Name ZLI-1565) added 1% black coloring matter (MITSUITOATSU CHEMICALS, INC.: Trade Name M-307) was enclosed in the cell 1. A first polarizer plate 2 of 80% degree of polarization and a second polarizer 3 of 99% degree of polarization were placed on the opposite side surfaces of the liquid crystal cell 1 with the respective polarization axes of the polarizer plates made registered to provide a negative, TN type LCD. The Δn of this liquid crystal is 0.13.

A color filter 4 in which red and green colors are combined was disposed at the rear side of the liquid crystal cell, a light scattering plate 5 was disposed at the rear side of the filter 4, and a transmissive display was realized by using radiation light by a tungsten lamp 6, whereby a good black-red black-green color switch having a wide visual angle with no interference color could be obtained. The reference numeral 7 in the drawing designates a masking sheet.

EMBODIMENT 2

A nematic liquid crystal (ROCHE: Trade Name RO-TN-653) added 1% black coloring matter (MITSUITOATSU CHEMICALS, INC.: Trade Name M-176) was enclosed in a liquid crystal cell having a base-plate gap of 10 μm. A first polarizer plate of 80% degree of polarization and a second polarizer of 95% degree of polarization were placed on the opposite side surfaces of the liquid crystal cell with the respective polarization axes of the polarizer plates made registered to provide a negative, TN type LCD. The Δn of this liquid crystal is 0.134. A green color filter was disposed at the rear side of the liquid crystal cell, and a transmissive display was realized by using radiation light by a fluorescent lamp, whereby a good black-green color switch having a wide visual angle could be obtained.

What we claim is:

1. A liquid crystal display device in which a twisted nematic type liquid crystal display element is used as a light shutter and combined with color polarizer plates to provide color display characterized in that a nematic crystal added with a black coloring material is used and in that at least one of said polarizer plates has a degree of polarization of about 80% or less.

2. A liquid crystal display device according to claim 1, characterized in that the rate of addition of said black coloring matter is limited to about 1.5% or less.

* * * * *